US011428324B2

(12) United States Patent
Tokunaga et al.

(10) Patent No.: US 11,428,324 B2
(45) Date of Patent: Aug. 30, 2022

(54) SEAL DEVICE

(71) Applicant: EAGLE INDUSTRY CO., LTD., Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Hidetoshi Kasahara, Tokyo (JP); Jun Hiromatsu, Tokyo (JP); Yasuhiro Kuroki, Tokyo (JP); Ryu Kikuchi, Tokyo (JP)

(73) Assignee: EAGLE INDUSTRY CO., LTD.

(*) Notice: Subject to any disclaimer, the term of this patent is extended or adjusted under 35 U.S.C. 154(b) by 192 days.

(21) Appl. No.: 16/497,436

(22) PCT Filed: Mar. 27, 2018

(86) PCT No.: PCT/JP2018/012251
§ 371 (c)(1),
(2) Date: Sep. 24, 2019

(87) PCT Pub. No.: WO2018/181228
PCT Pub. Date: Oct. 4, 2018

(65) Prior Publication Data
US 2021/0054936 A1    Feb. 25, 2021

(30) Foreign Application Priority Data
Mar. 30, 2017  (JP) .............................. JP2017-066480

(51) Int. Cl.
*F16J 15/44*       (2006.01)
(52) U.S. Cl.
CPC ................................. *F16J 15/441* (2013.01)

(58) Field of Classification Search
CPC ......... F16J 15/3444; F16J 15/43; F16J 15/441
See application file for complete search history.

(56) References Cited

U.S. PATENT DOCUMENTS 2,883,212 A * 4/1959 Laser .................... F16J 15/441
                                                     277/419
2,974,981 A    3/1961 Hendrik ................... F16J 15/43
(Continued)

FOREIGN PATENT DOCUMENTS

CN    107588199         1/2018   ............... F16J 15/16
JP    S50144156 A      11/1975
(Continued)

OTHER PUBLICATIONS

International Search Report (ISR) dated Jun. 12, 2018, issued for International application No. PCT/JP2018/012251. (1 page).
(Continued)

*Primary Examiner* — Christine M Mills
*Assistant Examiner* — L. Susmitha Koneru
(74) *Attorney, Agent, or Firm* — Hayes Soloway P.C.

(57) ABSTRACT

In an exemplary embodiment, a seal device (10) that seals between a housing (11) and a rotation shaft (20) passing through the housing (11) includes: a floating ring (15) arranged with a gap h with respect to the rotation shaft (20), a seal portion (14) formed by bringing one end face of the floating ring (15) into contact with the housing (11), and a space portion j provided between the floating ring (15) and the housing (11), and the floating ring (15) includes bias means that contactlessly biases the floating ring (15) to the seal portion via the space portion j. The seal device in which the floating ring follows movement of the rotation shaft is capable of exerting a sealing operation so that vibration of the rotation shaft can be reduced.

5 Claims, 12 Drawing Sheets

(56) References Cited

U.S. PATENT DOCUMENTS

| | | | | |
|---|---|---|---|---|
| 3,964,753 | A | 6/1976 | Junker | F16J 15/30 |
| 3,991,588 | A | 11/1976 | Laskaris | F16J 15/441 |
| 4,795,168 | A * | 1/1989 | Adams | F16C 33/78 |
| | | | | 277/378 |
| 5,137,286 | A * | 8/1992 | Whitford | F16J 15/441 |
| | | | | 277/410 |
| 6,210,103 | B1 | 4/2001 | Ramsay | F04D 29/0413 |
| 6,220,602 | B1 | 4/2001 | Webster | F16J 15/3288 |
| 6,543,781 | B1 * | 4/2003 | Rehm | F16C 33/765 |
| | | | | 277/410 |
| 6,746,019 | B1 | 6/2004 | Liebenberg | F16J 15/3444 |
| 8,186,945 | B2 | 5/2012 | Bhatnagar | F01D 11/22 |
| 9,771,821 | B1 | 9/2017 | Mills | F16J 15/445 |
| 11,078,919 | B2 * | 8/2021 | Tokunaga | F04D 29/12 |
| 2006/0033287 | A1 | 2/2006 | Rago | F16J 15/441 |
| 2006/0239816 | A1 | 10/2006 | Labbe | F01D 11/003 |
| 2006/0244221 | A1 * | 11/2006 | Villeneuve | F16J 15/3444 |
| | | | | 277/410 |
| 2008/0042364 | A1 * | 2/2008 | Zheng | F16J 15/3444 |
| | | | | 277/378 |
| 2009/0121440 | A1 | 5/2009 | Fiestel | F16J 15/56 |
| 2014/0008872 | A1 | 1/2014 | Inoue | F16J 15/441 |

FOREIGN PATENT DOCUMENTS

| | | | |
|---|---|---|---|
| JP | S57154562 | 9/1982 | F16J 15/44 |
| JP | S52129866 | 10/1997 | F16J 15/16 |
| JP | H11325260 A | 11/1999 | |

OTHER PUBLICATIONS

International Search Report (ISR) dated Apr. 24, 2018 in International Application No. PCT/JP2018/006091 (1 pg).

* cited by examiner

SEAL DEVICE

CROSS-REFERENCE TO RELATED APPLICATIONS

This application is the U.S. National Phase under 35 U.S.C. § 371 of International Application PCT/JP2018/012251, filed Mar. 27, 2018, which claims priority to Japanese Patent Application No. JP2017-066480, filed Mar. 30, 2017. The International Application was published under PCT Article 21(2) in a language other than English.

TECHNICAL FIELD

The present invention relates to a seal device that seals between a housing and a rotation shaft passing through the housing, and in particular, relates to a seal device including a floating ring used for a rotation shaft of a fluid machine such as a pump.

BACKGROUND ART

Conventionally, in a rotating fluid machine such as a pump, in order to seal a fluid, a seal device including a floating ring is used, and for example, a seal device shown in FIG. 12 is known (hereinafter, called as the "Conventional Art," for example, refer to Patent Document 1.) This Conventional Art is a seal device in which a seal ring 64 (floating ring) that partitions the high pressure fluid side and the low pressure fluid side is provided in a ring groove 63 of a member 61 through which a rotation shaft 62 passes. In the seal device, a cutout 66 is provided on a low pressure side end face of the seal ring 64 from the outer peripheral side to the inner peripheral side, and a preload spring 67 that presses a high pressure side end face of the seal ring 64 is provided. By fluid pressure generated by a pressure difference of a fluid acting on the high pressure side end face and the low pressure side end face of the seal ring 64 and pressing force of the preload spring 67, the seal ring 64 is pressed to the member 61 and seals the fluid. In this Conventional Art, by adjusting size of the cutout 66 provided on the low pressure side end face of the seal ring 64, the fluid pressure acting on the seal ring 64 is reduced and frictional force between the seal ring 64 and the ring groove 63 is reduced. In such a way, by adjusting the frictional force, the seal ring 64 can be easily moved in the ring groove 63, and by the wedge effect generated between the seal ring 64 and the rotation shaft 62 by rotation of the rotation shaft 62 (effect of dynamic pressure generated in a wedge portion) and the Lomakin effect (aligning effect by flow losses of a fluid between surfaces of a seal ring and a shaft at the time of generation of a seal pressure difference), even during the rotation of the rotation shaft 62, it is possible to prevent contact between the seal ring 64 and the rotation shaft 62, and it is possible to seal the fluid while holding a radial gap h.

CITATION LIST

Patent Documents

Patent Document 1: JP 11-325260 A

SUMMARY OF THE INVENTION

Problem to be Solved by the Invention

However, in the Conventional Art, the preload spring 67 presses while being displaced relatively with the high pressure side end face of the seal ring 64. Thus, upon running for a long time, the seal ring 64 is worn out, a dent occurs, and the seal ring 64 is restrained by the preload spring 67 stuck in the dent. Therefore, there is a possibility that the seal ring 64 cannot freely moved in the ring groove 63. As a result, when the rotation shaft largely runs out, the seal ring 64 cannot follow movement of the rotation shaft 62, and the seal ring 64 is frequently brought into contact with the rotation shaft 62 and worn out. Thus, there is a possibility that the radial gap h becomes larger than an optimal value and a proper sealing operation cannot be obtained.

Even in a state where the seal ring 64 is normally moved in the ring groove 63, a vibration reducing effect is small in the seal device of the Conventional Art. Thus, when the rotation shaft 62 largely runs out, the seal ring 64 follows that and largely runs out, and the seal ring 64 is brought into contact with the rotation shaft 62 and worn out. Thus, there is also a problem that the radial gap h becomes larger than an optimal value and a proper sealing operation cannot be obtained.

The present invention is achieved focusing on such problems, and an object thereof is to provide a seal device in which a floating ring follows movement of a rotation shaft to be capable of exerting a sealing operation, so that vibration of the rotation shaft can be reduced.

Means for Solving Problem

In order to solve the foregoing problems, a seal device according to a first aspect of the present invention is a seal device that seals between a housing and a rotation shaft passing through the housing, the seal device being characterized by including a floating ring arranged with a gap with respect to the rotation shaft, a seal portion formed by bringing one end face of the floating ring into contact with the housing, and a space portion provided between the floating ring and the housing, the seal device being characterized in that the floating ring includes bias means that contactlessly biases the floating ring to the seal portion via the space portion.

According to the first aspect, the floating ring is contactlessly biased. Thus, movement of the floating ring is not restrained by the bias means, and the floating ring can follow movement of the rotation shaft. It is possible to restrict leakage of a fluid by utilizing bias force of the bias means and pressure of the fluid.

The seal device according to a second aspect of the present invention is characterized in that the bias means includes a magnet provided at least in one of the floating ring and the housing, and the floating ring is biased to the seal portion side by attracting force of the magnet.

According to the second aspect, the floating ring is contactlessly biased in the axial direction by the magnetic attracting force of the magnet. Thus, the movement of the floating ring is not restrained by the bias means.

The seal device according to a third aspect of the present invention is characterized in that the bias means includes magnets provided in the floating ring and the housing, and the floating ring is biased to the seal portion side by repulsion force of the magnets.

According to the third aspect, the floating ring is contactlessly biased in the axial direction by the repulsion force of the magnet. Thus, the movement of the floating ring is not restrained by the bias means.

The seal device according to a fourth aspect of the present invention is characterized in that the magnet includes a magnetic member that covers at least one of magnetic pole faces.

According to the fourth aspect, it is possible to efficiently transmit magnetic flux of the magnet to the floating ring or the housing.

The seal device according to a fifth aspect of the present invention is characterized in that in the space portion, a part on the seal portion side is narrower than a part on the seal portion opposite side.

According to the fifth aspect, it is possible to stably bias the floating ring to the seal portion by utilizing the attracting force of the magnet of the bias means.

The seal device according to a sixth aspect of the present invention is characterized in that at least one groove portion is provided in a seal portion side inner wall portion of the housing, and the groove portion is arranged on at least one of the radially outside and the radially inside of the magnet provided in the floating ring.

According to the sixth aspect, the magnetic flux often flows where a gap is small and hardly flows in the groove portion where a gap is large. Thus, when the floating ring runs out following run-out of the rotation shaft, magnetic force of the magnet attached to the floating ring acts to stay in a second axial gap where a gap is narrow. Therefore, the run-out of the floating ring is reduced, and eventually it is possible to reduce vibration of the rotation shaft.

The seal device according to a seventh aspect of the present invention is characterized in that at least one of the floating ring and the housing is made of a magnetic material.

According to the seventh aspect, the bias means can stably bias the floating ring from the high pressure fluid side to the low pressure fluid side.

BRIEF DESCRIPTION OF THE DRAWINGS

FIG. 2A shows a case where the magnets are arranged so that magnetic pole faces are directed in the axial direction and magnetic poles of the circumferentially adjacent magnets are the same pole as each other; FIG. 2B shows a case where the magnets are arranged so that the magnetic pole faces are directed in the axial direction and the magnetic poles of the circumferentially adjacent magnets are different poles from each other; and FIG. 2C shows a case where the magnets are arranged so that the magnetic pole faces are directed in the circumferential direction.

FIG. 3A shows a case where a radial position of a low pressure side end face of the magnet substantially matches with a radial position of an inner wall portion of a housing; and FIG. 3B shows a case where the radial position of the low pressure side end face is displaced from the radial position of the inner wall portion of the housing.

FIG. 7A shows a case where a radial position of a low pressure side end face of the magnet substantially matches with a radial position of an inner wall portion of a housing; and FIG. 7B shows a case where the radial position of the low pressure side end face is displaced from the radial position of the inner wall portion of the housing.

FIG. 9A shows a case where the magnets are arranged so that magnetic pole faces are directed in the axial direction and magnetic poles of the circumferentially adjacent magnets are the same pole as each other; FIG. 9B shows a case where the magnets are arranged so that the magnetic pole faces are directed in the circumferential direction and the magnetic poles of the circumferentially adjacent magnets are the same pole as each other; and FIG. 9C shows a case where the magnets are arranged so that yokes are attached to the magnetic pole faces and the magnetic pole faces are directed in the circumferential direction.

DESCRIPTION OF EMBODIMENTS

First Embodiment

Figure 1:
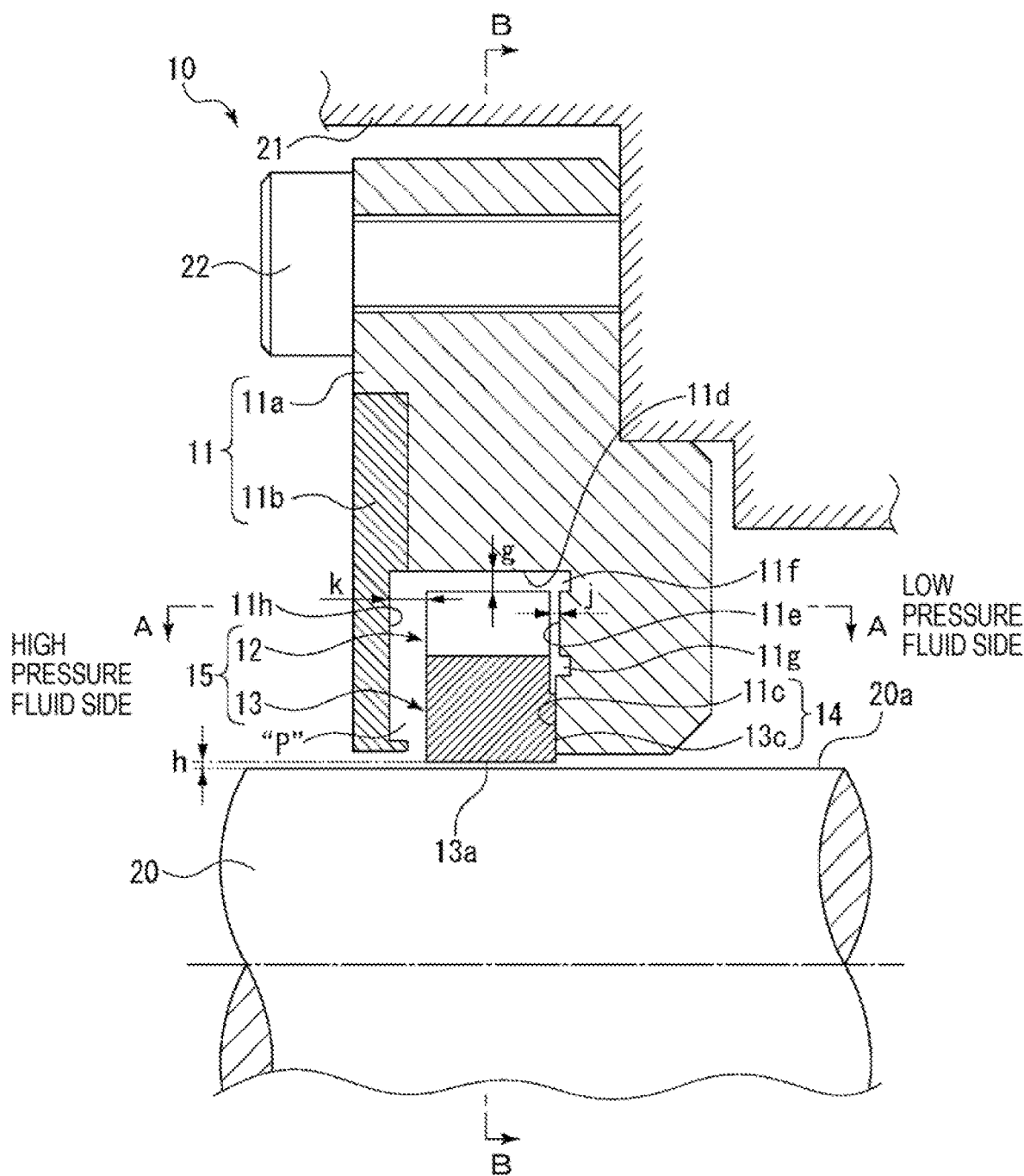
FIG. 1 is a front sectional view of a first embodiment of a seal device of the present invention.

Modes for carrying out a seal device according to the present invention will be described in detail with reference to the drawings. However, the present invention is not interpreted while being limited to this. As long as not departing from the scope of the present invention, various modifications, corrections, and improvements can be added based on the knowledge of those skilled in the art.

A seal device 10 according to an embodiment of the present invention will be described with reference to FIGS. 1 to 4. A rotation shaft 20 of a fluid machine is arranged so as to pass through a casing 21, and the left side is the high pressure fluid side and the right side is the low pressure fluid side. The seal device 10 is mainly formed by a floating ring 15 arranged with a radial gap h with respect to an outer periphery of the rotation shaft, and a housing 11 that accommodates the floating ring 15, and restricts leakage of a fluid from the high pressure fluid side to the low pressure fluid side.

The housing 11 is mainly formed by a holder 11a and a flange 11b. The holder 11a is fixed to the casing 21 by fastening means 22. The holder 11a has an internal space surrounded by an inner peripheral wall 11d formed in a cylindrical shape, a low pressure side inner wall portion 11e (seal portion side inner wall portion) extending from a low pressure fluid side end portion of the inner peripheral wall 11d to the radially inside, and a holder seal face 11c continuously connected from the low pressure side inner wall portion 11e to the radially inside. An accommodation portion P is formed by surrounding the high pressure fluid side of the internal space by the flange 11b. The low pressure side inner wall portion 11e is finished to be substantially perpendicular to the rotation shaft 20. The holder seal face 11c slightly pops out to the high pressure fluid side in the axial direction more than the low pressure side inner wall portion 11e, and is finished to be substantially perpendicular to the rotation shaft 20. In an outer peripheral portion of the low pressure side inner wall portion 11e, an outside annular groove portion 11f (groove portion according to the present invention) recessed to the low pressure fluid side in the axial direction is formed substantially along an outer periphery of magnets 12. In an inner peripheral portion of the low pressure side inner wall portion 11e, an inside annular groove portion 11g (groove portion according to the present invention) recessed to the low pressure fluid side in the axial direction is formed substantially along an inner periphery of the magnets 12. Radial width of the low pressure side inner wall portion 11e is substantially the same as radial width of a magnetic pole face 12b of the magnet 12.

The floating ring 15 is mainly formed by a seal ring 13 and the magnets 12 provided in an outer periphery of the seal ring 13. The floating ring 15 is accommodated in the accommodation portion P of the housing 11. In a state where the floating ring is accommodated in the accommodation portion P of the housing 11, the floating ring 15 has the radial gap h with respect to the rotation shaft 20 and an outside radial gap g with respect to the inner peripheral wall 11d of the housing. Although not shown, circumferential movement of the floating ring 15 with respect to the housing 11 is regulated by a circumferentially regulating member. The circumferentially regulating member may be a pin provided in the housing 11 or may be utilization of magnetic repulsion force of the magnet.

The seal ring 13 is a ring-shaped member having a substantially-rectangular section, made of a material having a favorable sliding property such as carbon. An inner peripheral face 13a of the seal ring 13 is formed in a cylindrical face having the minute radial gap h with respect to an outer peripheral face 20a of the rotation shaft 20. A clearance seal portion is formed by the inner peripheral face 13a of the seal ring 13 and the outer peripheral face 20a of the rotation shaft 20. A seal ring seal face 13c is formed on a low pressure fluid side end face of the seal ring 13.

The magnets 12 (bias means according to the present invention) are magnetized in the axial direction, and attached to the outer periphery of the seal ring 13. An outer peripheral face of the magnet 12 is formed in a cylindrical face having the radial gap g with respect to the inner peripheral wall 11d of the housing 11. The magnets 12 of the floating ring 15 have a second axial space k (seal portion side space j) from the low pressure side inner wall portion 11e of the housing 11. The floating ring 15 is contactlessly biased to the seal ring seal face 13c (seal portion 14) via the second axial space k by magnetic force of the magnets 12, and the seal ring seal face 13c and the holder seal face 11c are closely attached to each other, so that sealing is made between the seal ring 13 and the housing 11. The seal portion 14 is formed by the seal ring seal face 13c and the holder seal face 11c.

Figure 2:
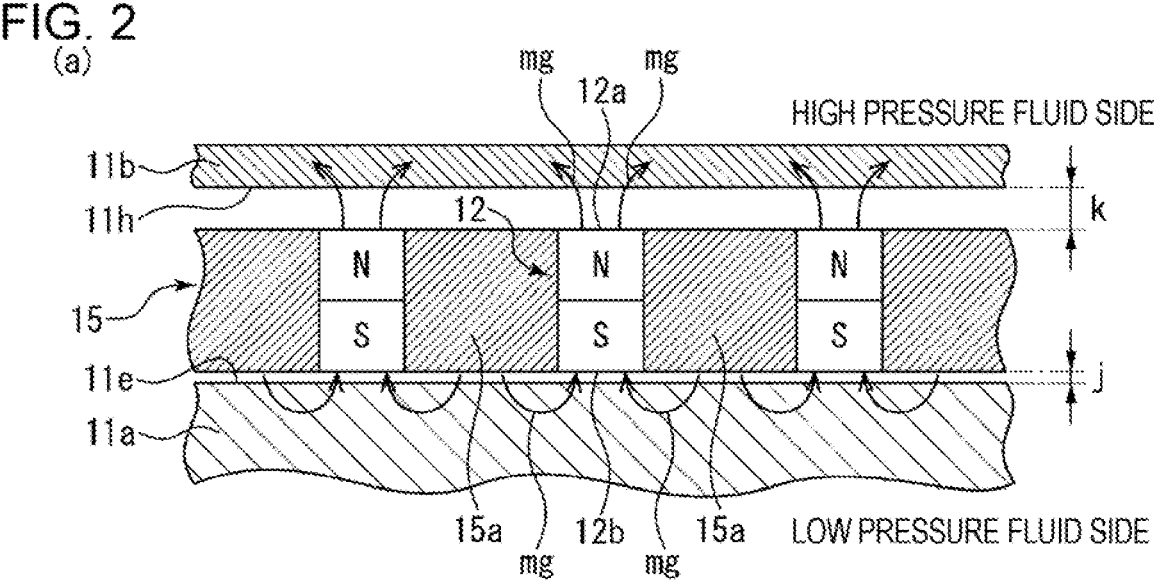
FIG. 2 is views taken along the arrow A-A of FIG. 1, showing circumferential arrangements of magnets attached to a floating ring.
Figure 2:
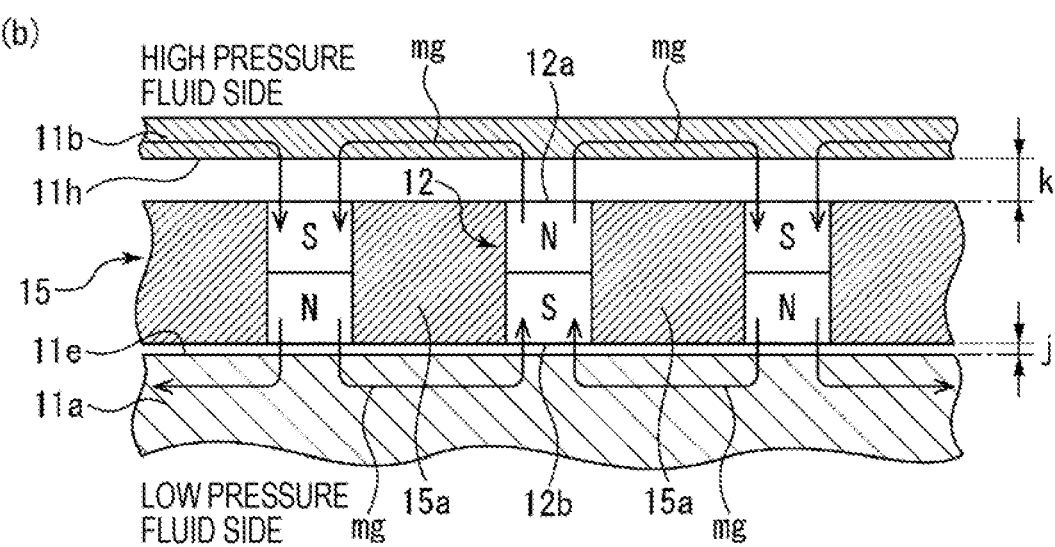
Figure 2:
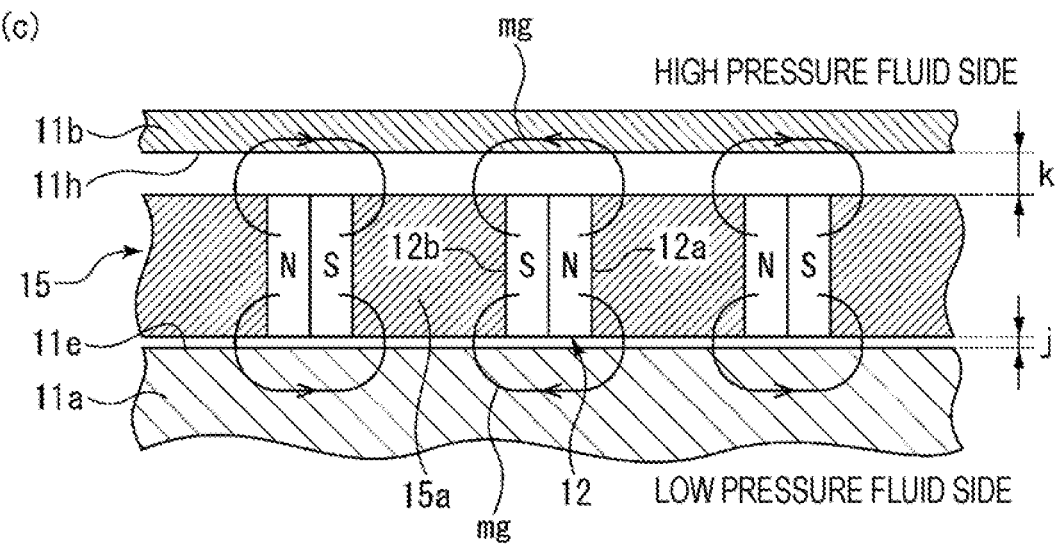

The magnets 12 are permanent magnets made of ferrite magnets, neodymium magnets, samarium-cobalt magnets, alnico magnets, praseodymium magnets, etc., and the magnets are selected according to a temperature condition for use and required magnetic force. As shown in FIG. 2, an arrangement of the magnets 12 can be made by various patterns.

FIG. 2A is a view taken along the arrow A-A of FIG. 1, showing a circumferential arrangement of the magnets 12 attached to the floating ring 15. In the magnet arrangement of FIG. 2A, the plural magnets are arranged so that the magnetic pole faces 12a, 12b of the magnets 12 are directed in the axial direction in an outer periphery of the floating ring 15, and all the circumferentially adjacent magnets 12 have the same magnetic pole as each other. Specifically, all the N magnetic pole faces 12a are arranged on the flange 11b side, and all the S magnetic pole faces 12b are arranged on the holder 11a side. All the S magnetic pole faces 12b may be arranged on the flange 11b side, and all the N magnetic pole faces 12a may be arranged on the holder 11a side. The magnetic pole faces 12a, 12b are magnet surfaces perpendicular to the magnetizing direction of the magnets 12.

In FIG. 2A, intermediate members 15a are arranged between the plural magnets 12. Intervals of the magnets 12 are fixed, and an outer diameter of the magnets 12 is the same as an outer diameter of the intermediate members 15a. The floating ring 15 is formed in an axially annular member integrated with the magnets 12, the intermediate members 15, and the seal ring 13.

The intermediate members 15a may be formed by non-magnetic bodies or magnetic bodies. For the non-magnetic bodies, non-magnetic steel of austenite stainless, non-ferrous metal such as aluminum, copper, brass, and titanium, plastic such as thermoplastic resin and thermosetting resin, FRP reinforced by glass fiber, etc. can be used. For the magnetic bodies, a steel material such as soft steel, hard steel, cast steel, cast iron, and a magnetic steel sheet can be used.

In FIG. 2A, the second axial space k between a seal portion side end face of the floating ring 15 (low pressure fluid side end face of the floating ring) and the opposing low pressure side inner wall portion 11e of the housing 11 is formed to be smaller than a first axial space j (seal portion opposite side space k) between a seal portion opposite side end face of the floating ring 15 (high pressure fluid side end face of the floating ring) and an opposing flange inner wall portion 11h. Thereby, magnetic attracting force by S pole magnetic flux mg of the magnets strongly acts on the low pressure side inner wall portion 11e side where a gap is narrow, so that the floating ring 15 is efficiently pressed to the low pressure side inner wall portion 11e. The holder 11a and the flange 11b may be made of a magnetic material. However, by making the holder 11a on the low pressure fluid side of a magnetic material and making the flange 11b on the high pressure fluid side of a non-magnetic material, the magnetic attracting force to the high pressure fluid side can be further weakened. Thus, it is possible to press the floating ring 15 to the low pressure side inner wall portion 11e. The holder 11a and the flange 11b may be made of a non-magnetic material, and the low pressure side inner wall portion 11e made of a ferromagnetic body such as soft steel as a separate body may be attached to the holder 11a, so that the floating ring 15 is attracted to the low pressure side inner wall portion 11e side.

Next, a magnet arrangement of FIG. 2B will be described. The magnet arrangement of FIG. 2B is the same as the magnet arrangement of FIG. 2A in a point that the plural magnets are arranged so that the magnetic pole faces 12a, 12b of the magnets 12 are directed in the axial direction in the outer periphery of the floating ring 15, but different from the magnet arrangement of FIG. 2A in a point that all the circumferentially adjacent magnets 12 have different magnetic poles from each other.

Specifically, on the flange 11b side, the N magnetic pole face 12a side and the S magnetic pole face 12b side of the plural magnets 12 are alternately arranged. In FIG. 2B, only the magnet arrangement is different from FIG. 2A but the other configurations are the same as FIG. 2A, and the function as bias means is also the same.

Next, a magnet arrangement of FIG. 2C will be described. The magnet arrangement of FIG. 2C is different from the magnet arrangements of FIGS. 2A, 2B in a point that the plural magnets are arranged so that the magnetic pole faces of the magnets 12 are directed in the circumferential direction in the outer periphery of the floating ring 15. In order to prevent short of the magnetic flux mg from the N pole to the S pole, the circumferentially adjacent magnets 12 are arranged to have the same magnetic pole as each other. Since the adjacent magnets 12 are arranged to have the same magnetic pole, for example, the N pole magnetic flux mg due to repulsion between the N magnetic poles flows in the axial direction. Thus, magnetic attracting force acts in the axial direction. Conversely, when the adjacent magnets 12 are arranged to have different magnetic poles from each other, for the magnetic flux mg, a short circuit occurs between the N pole and the S pole adjacent to each other, and almost no magnetic attracting force is generated in the axial direction. In FIG. 2C, only the magnet arrangement is different from FIGS. 2A, 2B but the other configurations are the same as FIGS. 2A, 2B, and the function as bias means is also the same.

Figure 3:
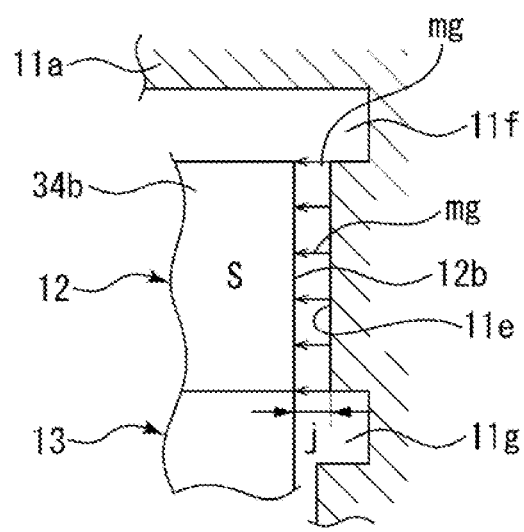
FIG. 3 is views for illustrating radial restoring force by magnetic force acting on the floating ring.
Figure 3:
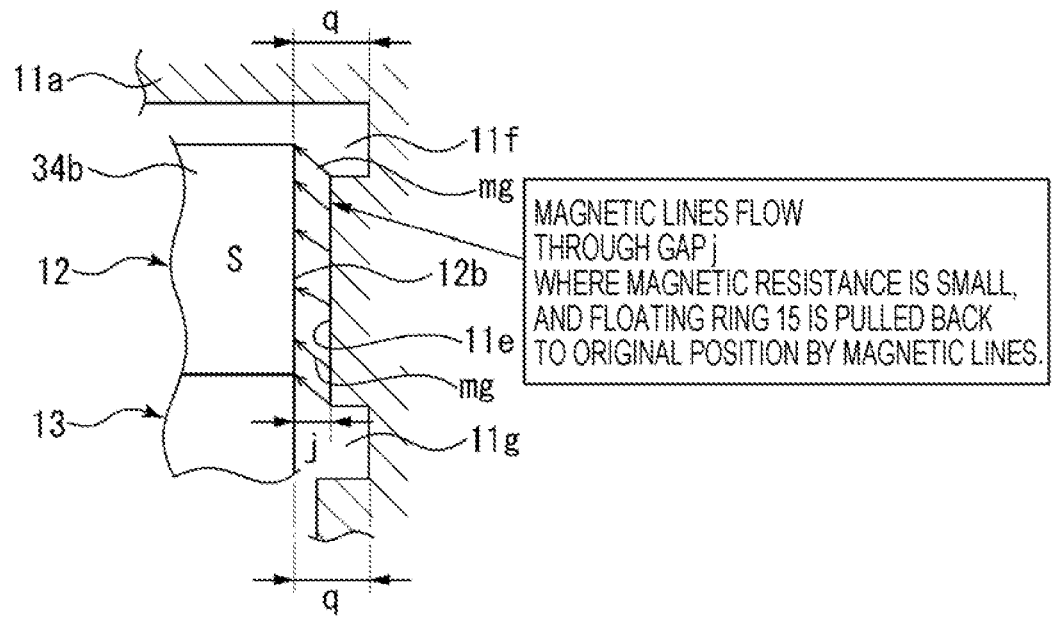

Next, radial position restoring force of the magnets 12 will be described. As shown in FIG. 3, in the low pressure side inner wall portion lie opposing the magnetic pole face 12b of the magnet 12 via the second axial space k, the outside annular groove portion 11f is provided to oppose an outer peripheral face of the magnet 12 and the inside annular groove portion 11g is provided to oppose an inner peripheral face of the magnet 12. Thereby, between the floating ring 15 and the low pressure side inner wall portion 11e, it is possible to enhance the magnetic attracting force of the magnet 12 to contactlessly hold a radial position. A third axial gap q between the magnetic pole face 12b of the magnet 12 and a bottom portion of the outside annular groove portion 11f and a bottom portion of the inside annular groove portion 11g is larger than the second axial space k between the magnet pole face 12b of the magnet 12 and the low pressure side inner wall portion 11e. Thus, magnetic resistance is small in the second axial space k where a gap is small, and magnetic resistance is large in the third axial gap q where a gap is large. As shown in FIG. 3A, almost all the magnetic flux mg of the magnet 12 flows through the second axial space k where the magnetic resistance is small but the magnetic flux does not flow through the outside annular groove portion 11f and the inside annular groove portion 11g where the magnetic resistance is large. Thus, the magnetic attracting force of the magnet 12 acts to hold the position opposing the low pressure side inner wall portion 11e. Even when the radial position of the magnet 12 is displaced as in FIG. 3B, the magnetic flux mg of the magnet 12 flows through the second axial space k where the magnetic resistance is small. Thus, by the magnetic attracting force between the magnet 12 and the low pressure side inner wall portion 11e, the magnet 12 is pulled back to the position opposing the low pressure side inner wall portion 11e. In such a way, the outside annular groove portion 11f and the inside annular groove portion 11g provided in the low pressure side inner wall portion 11e have large magnetic resistance. Thus, the annular groove portions act as contactless stoppers for the magnet 12.

Further, in addition to the radial position restoring force of the magnet 12 described above, a positioning effect due to frictional force generated by pressing the floating ring 15 to the holder seal face 11c by the pressure of the fluid and the magnetic force of the magnet 12 also acts on the floating ring. Thus, the positioning effect of the floating ring 15 is further enhanced. In a case where the positioning effect of the floating ring 15 is obtained by pressing force of a preload spring as in the Conventional Art, there is a need for enhancing the pressing force in order to enhance the positioning effect. When the pressing force is enhanced too much, frictional force is changed due to surface roughening of a secondary seal face by long term running, movement of the floating ring 15 is restrained, and there is a possibility that the floating ring 15 is frequently brought into contact with the rotation shaft 20 and the seal ring 13 is worn out. Meanwhile, with the radial position restoring force of the magnet 12, it is possible to obtain the positioning effect without enhancing contact surface pressure of the seal face. Thus, it is possible to reduce the change in the frictional force due to surface roughening of the seal face and eventually to suppress an increase in a leakage amount. Further, with the seal device according to the present invention, it is possible to press the floating ring 15 to the holder seal face 11c without using a spring. Thus, it is also possible to prevent resonance from mass of the spring and the floating ring.

Figure 4:
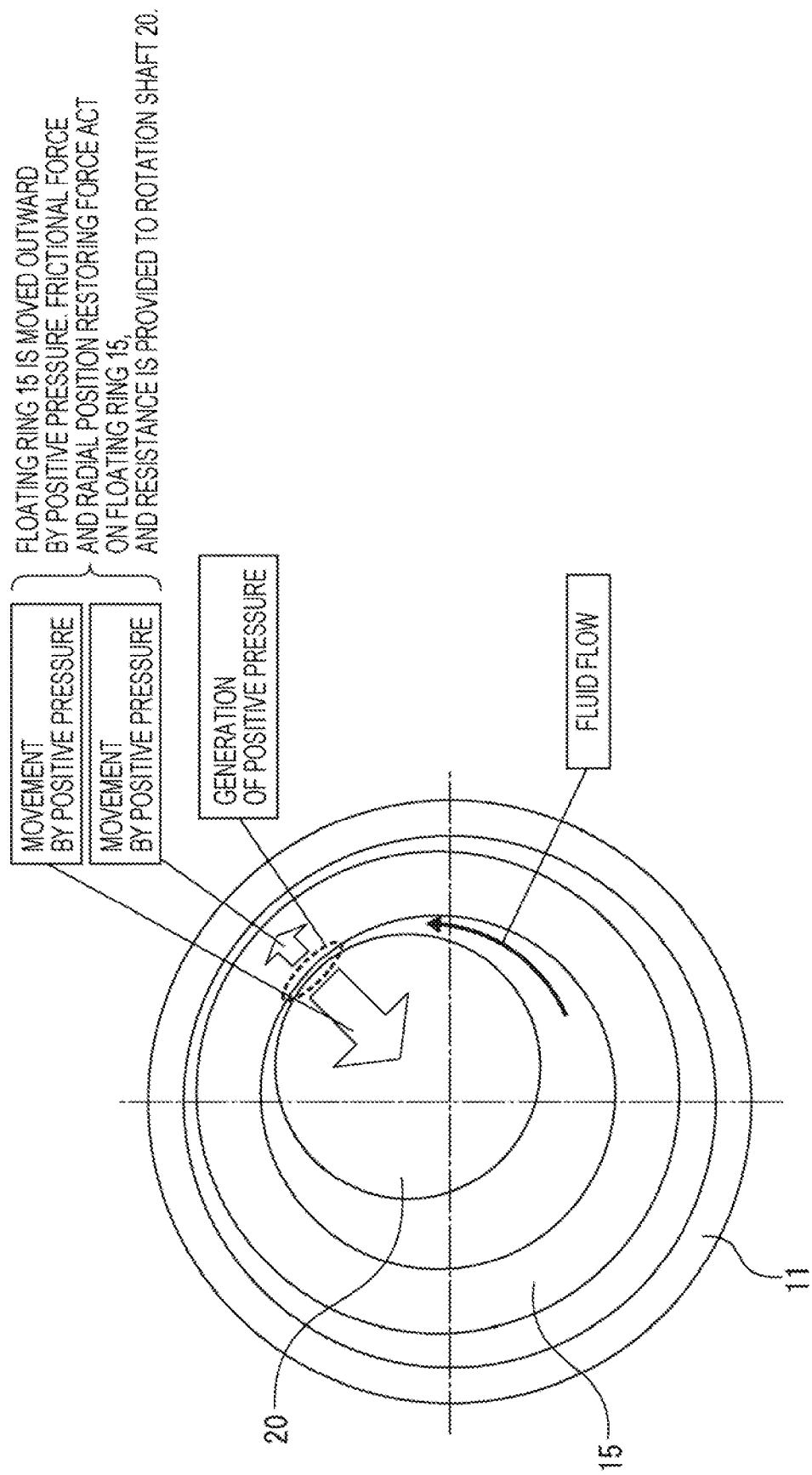
FIG. 4 is a view taken along the arrow B-B of FIG. 1 for illustrating a vibration reducing operation of the seal device.

Next, a vibration reducing effect of the rotation shaft 20 by the floating ring 15 will be described. As shown in FIG. 4, when the rotation shaft 20 runs out, positive pressure due to the wedge effect is generated between the rotation shaft 20 and the floating ring 15, and the floating ring 15 is moved to the radially outside by this positive pressure. However, in addition to the positioning effect due to the frictional force of the seal face generated by the pressure of the fluid and the magnetic force of the magnet 12, the radial position restoring force by the magnet 12 also acts on the floating ring 15. Thus, the floating ring 15 can provide resistance to movement of the rotation shaft 20, and it is possible to damp vibration of the rotation shaft 20.

Second Embodiment

Next, a seal device 30 according to a second embodiment will be described with reference to FIGS. 5 to 7. The seal device 30 of the second embodiment is different from the seal device of the first embodiment in a point that a floating ring 35 includes a yoke 34 (magnetic member according to the present invention). The same configurations as the above embodiment will be given the same reference signs and overlapping descriptions will be omitted.

Figure 5:
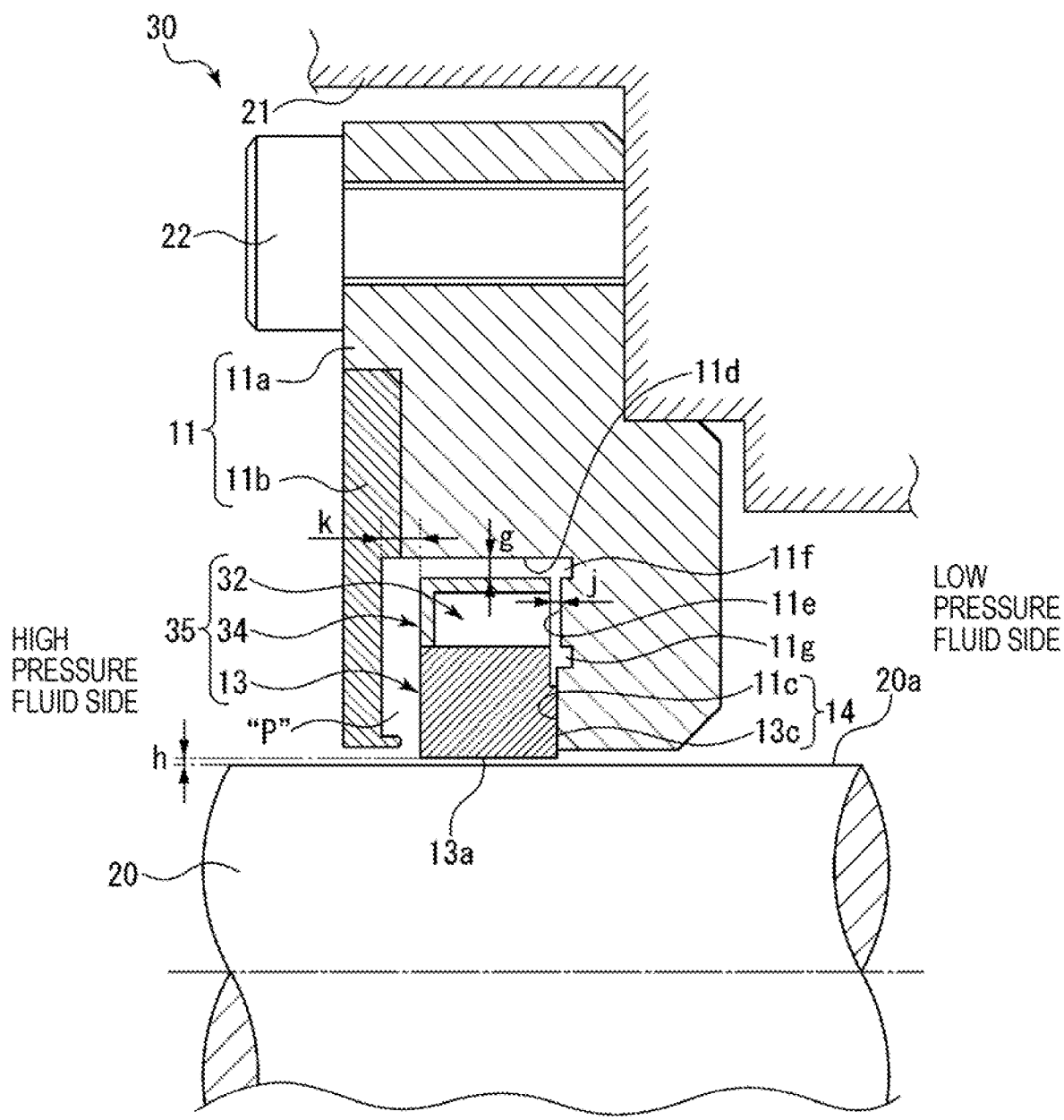
FIG. 5 is a front sectional view of a second embodiment of a seal device of the present invention.

As shown in FIG. 5, the floating ring 35 of the seal device 30 of the second embodiment is mainly formed by a seal ring 13, a magnet 32 provided in an outer periphery of the seal ring 13, and the yoke 34 provided in the magnet 32. For example, in FIG. 2A of the first embodiment, the S pole magnetic flux mg of the magnet 12 flows to the low pressure fluid side of the holder 11a, and the N pole magnetic flux mg flows to the flange 11b side of the high pressure fluid side. Thus, the N pole magnetic flux mg of the magnet 12 cannot effectively act on the holder 11a side of the low pressure fluid side, and there is sometimes a case where a magnet amount is increased in order to obtain necessary magnetic force. Therefore, by providing the yoke 34 in the magnet 32, magnetic flux is led to a desired place and large magnetic force is obtained with a smaller amount of the magnet.

The yoke 34 is made of a ferromagnetic body such as iron having less impurities, low-carbon steel, a magnetic steel sheet, and martensitic stainless steel. The yoke made of a ferromagnetic body has a property to let magnetic flux coming out of the magnet 32 pass through easily. Magnetic permeability is used as an indicator showing easiness of magnetic flux passing through the yoke. When magnetic permeability of the air is one, magnetic permeability of the ferromagnetic body described above has a value approximately ranging from 100 to 1,000. That is, the ferromagnetic body lets the magnetic flux pass through 100 to 1,000 times more easily than the air. By utilizing the yoke that lets the magnetic flux pass through easily, the magnetic flux can be led to a desired place.

Figure 6:
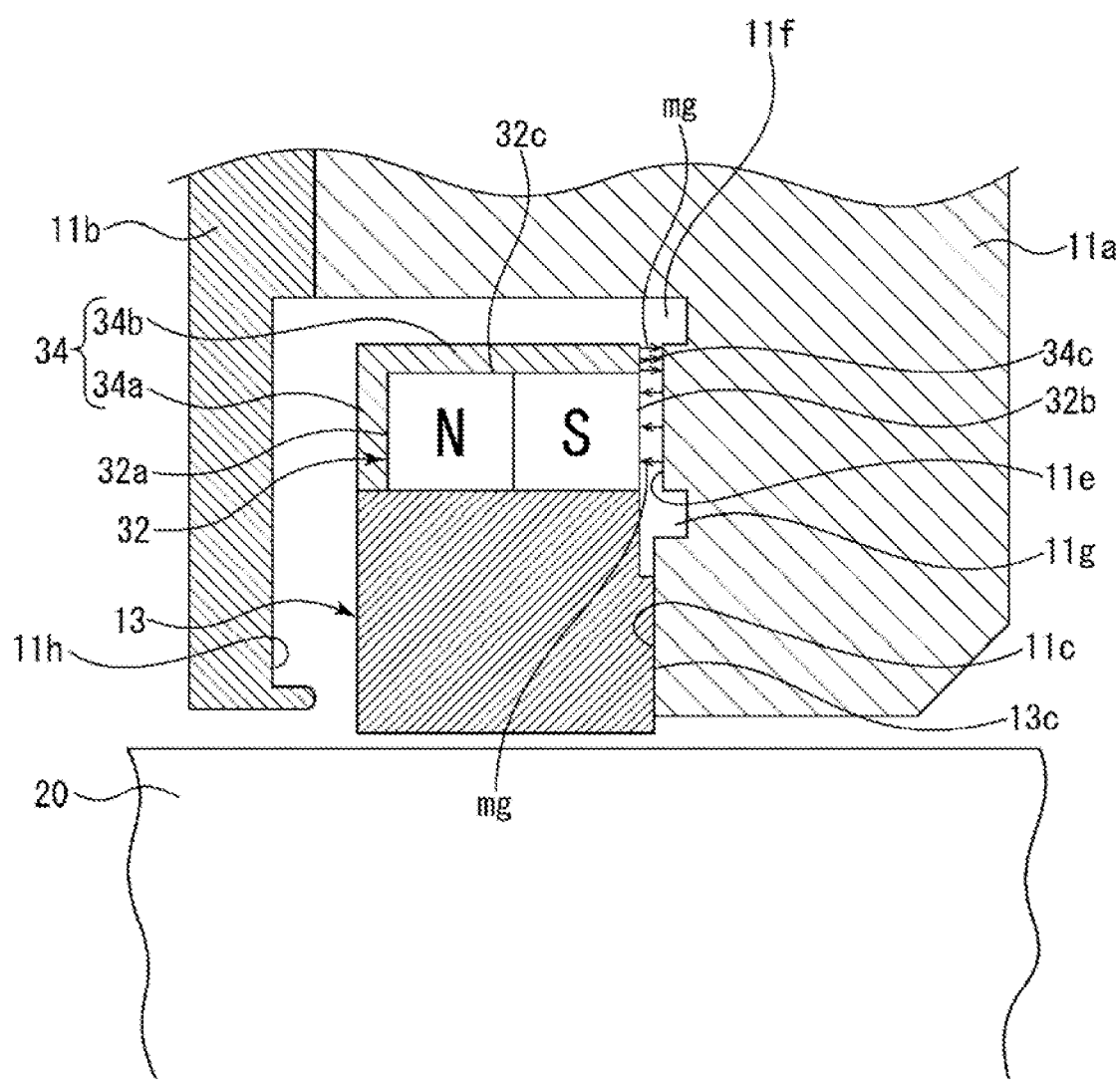
FIG. 6 is a view for illustrating an operation of a yoke attached to a magnet.

As shown in FIG. 6, one end face 34a of the yoke 34 covers an N magnetic pole face 32a of the magnet 32, a peripheral wall portion 34b extending from an end portion of the end face 34a in the axial direction is arranged to cover a magnetic pole adjacent face 32c where an N magnetic pole and an S magnetic pole are adjacent to each other, and an end portion 34c of the peripheral wall portion 34b is arranged to oppose a low pressure side inner wall portion 11e together with an S magnetic pole face 32b. Thereby, magnetic flux mg of the N magnetic pole and magnetic flux mg of the S magnetic pole flowing in the yoke 34 where magnetic resistance is small act on the low pressure side inner wall portion 11e. Thus, the floating ring 15 is strongly and contactlessly attracted to the low pressure side inner wall portion 11e in the axial direction.

The yoke 34 may be an annular member that covers the plural magnets 32 arranged while being divided in the circumferential direction integrally in the circumferential direction, or may be plural yoke pieces that cover only portions of the plural magnets 32 arranged while being divided. In a case where the magnet 32 covered by the yoke 34 made of an annular member is used in an environment where a temperature change is large, in order to prevent breakage of the magnet 32 due to differential thermal expansion, the yoke 34 can also be formed in a C shape provided with a slit.

Figure 7:
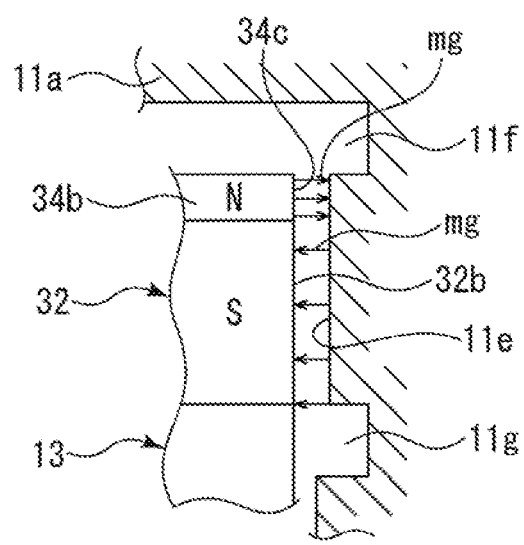
FIG. 7 is views for illustrating a returning effect by magnetic force acting on a floating ring.
Figure 7:
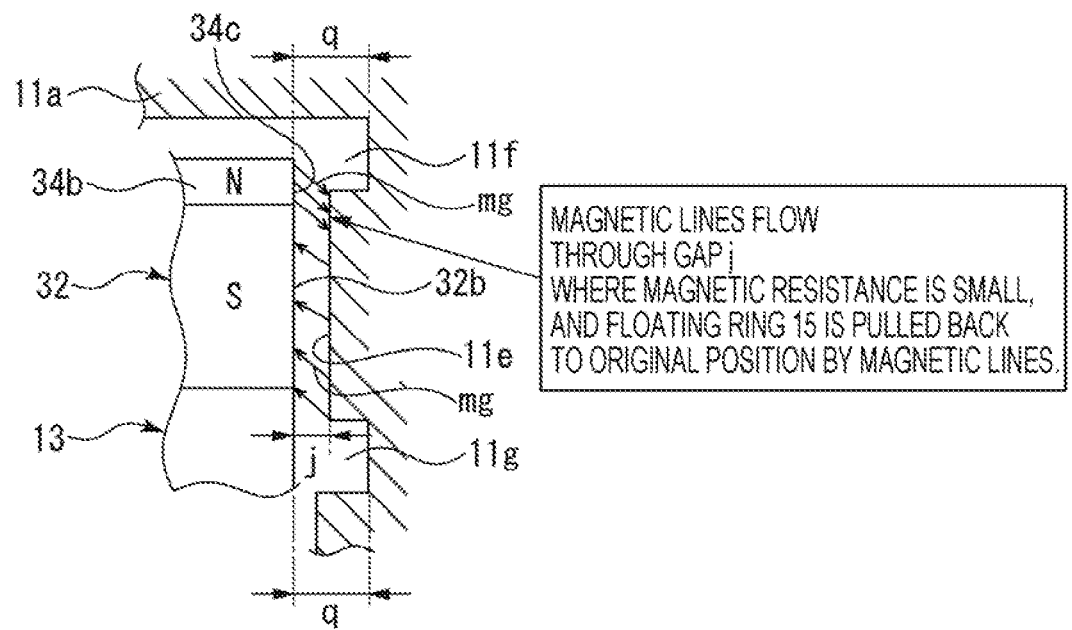

As shown in FIG. 7, radial position restoring force of the floating ring 35 to which the yoke 34 is attached can also be increased. That is, in a case of the magnet 12 having no yoke as in FIG. 3, the magnetic flux mg of the S magnetic pole acts on the low pressure side inner wall portion 11e. Meanwhile, in a case of the magnet 32 having the yoke as in FIG. 7, since the magnetic flux mg acts on the low pressure side inner wall portion 11e from both the N pole and the S magnetic pole, it is possible to increase magnetic force. Thereby, as shown in FIG. 7A, even when a radial position of the magnet 32 is displaced as in FIG. 7B from a stable state where a distance between the magnet 32 and the low pressure side inner wall portion 11e is the shortest, the radial position restoring force to pull the magnet back to the stable state by the magnetic flux mg of both the N pole and the S pole acts on the magnet 32, so that the floating ring 35 is pulled back to the position opposing the low pressure side inner wall portion 11e.

In such a way, by providing the yoke 34 in the magnet 32, the magnetic flux mg coming out of the N magnetic pole face 32a of the magnet 32 can be led to the low pressure side inner wall portion 11e side. Thus, it is possible to strongly bias the floating ring 35 to the low pressure side inner wall portion 11e side and also to increase the radial position restoring force. Thereby, regarding the floating ring 35, since frictional force generated by the pressure of the fluid and the magnetic force of the magnet 32 and the radial position restoring force are further increased, the floating ring 35 can provide large resistance with respect to run-out of a rotation shaft 20, and it is possible to enhance an effect of damping vibration of the rotation shaft 20. As a result of the reduction in the vibration of the rotation shaft 20, contact between the floating ring 35 and the rotation shaft 20 is also reduced. Thus, a radial gap h between the floating ring 35 and the rotation shaft 20 can be properly held, so that it is possible to reduce leakage of the fluid. Further, since the magnetic flux mg coming out of the magnet 32 can be effectively utilized, it is possible to reduce a magnet amount.

Third Embodiment

Next, a seal device 40 according to a third embodiment will be described with reference to FIGS. 8 and 9. The seal device 40 of the third embodiment is different from the seal devices 10, 30 of the first and second embodiments in which the floating rings 15, 35 include the magnets 12, 32 in a point that magnets 42 are provided in a holder 41a. The same configurations as the above embodiments will be given the same reference signs and overlapping descriptions will be omitted.

Figure 8:
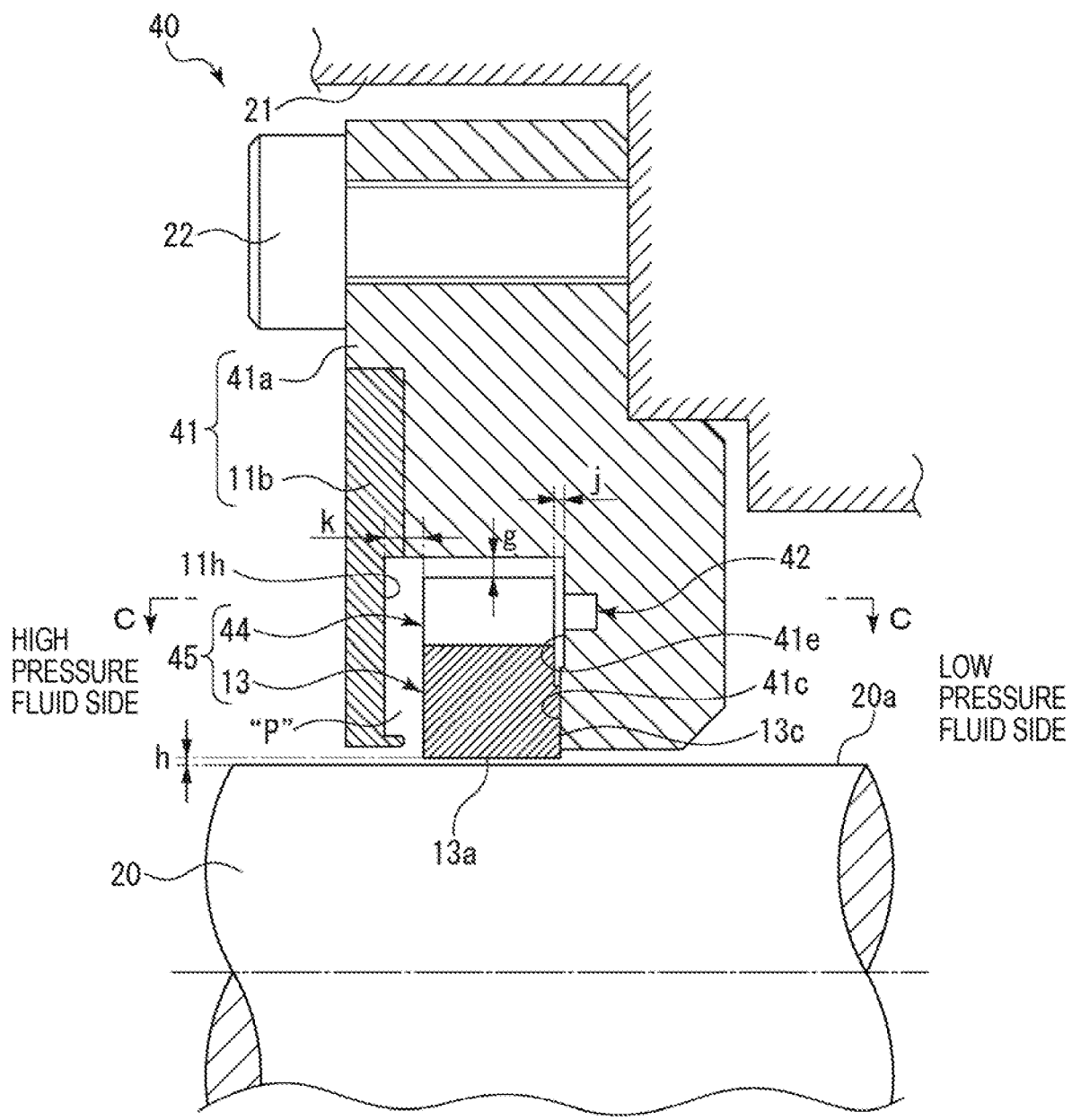
FIG. 8 is a front sectional view of a third embodiment of a seal device of the present invention.
Figure 9:
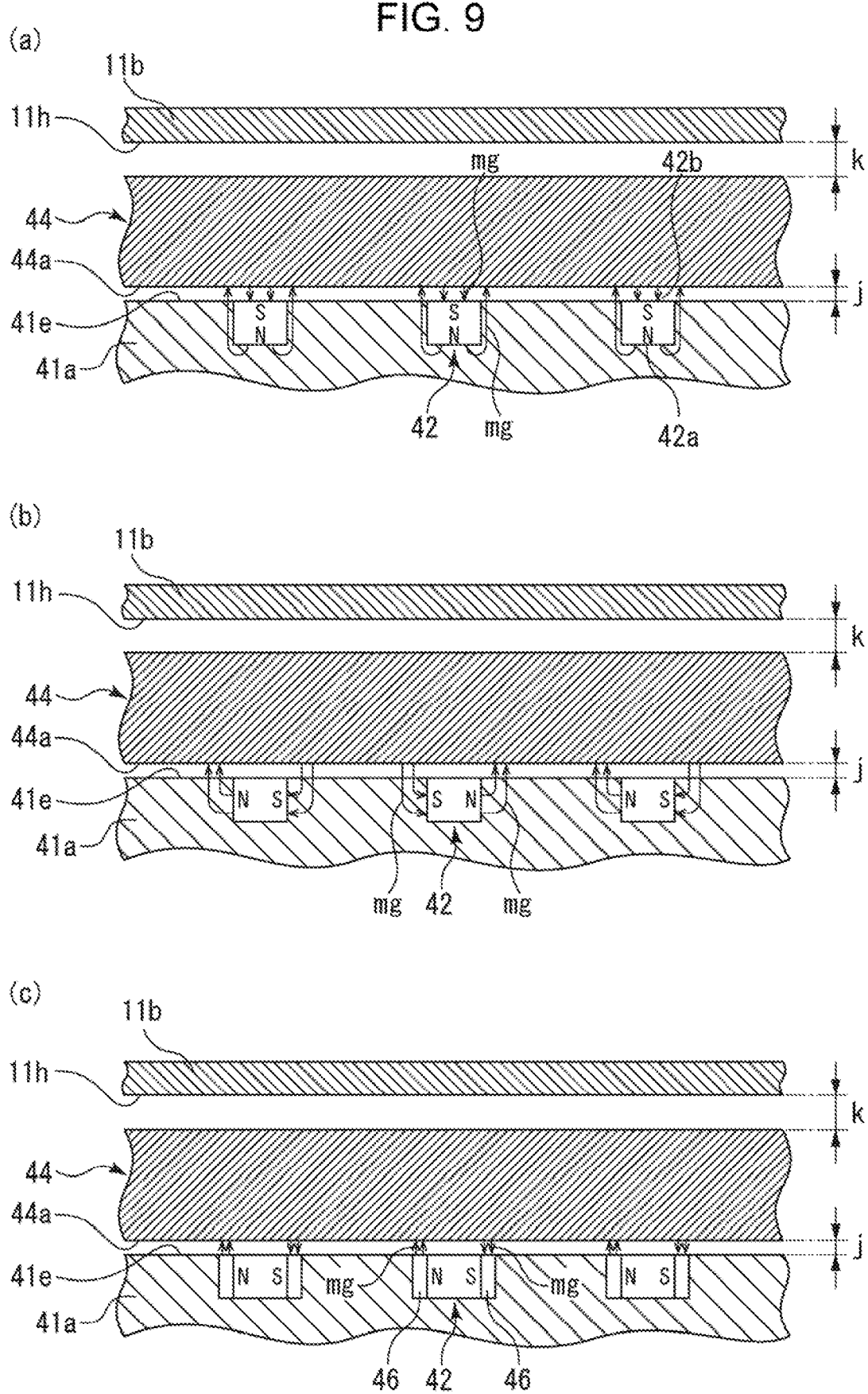
FIG. 9 is views taken along the arrow C-C of FIG. 8, showing circumferential arrangements of magnets attached to a housing.

As shown in FIG. 8, a floating ring 45 of the seal device 40 of the third embodiment is mainly formed by a seal ring 13, and a retainer 44 provided in an outer periphery of the seal ring 13. A housing 41 is formed by the holder 41a and a flange 11b, and the magnets 42 are embedded in a low pressure side inner wall portion 41e of the holder 41a.

The retainer 44 provided in an outer periphery of the floating ring 45 is an annular member made of a magnetic material so that the retainer is attracted by the magnets 42. As a magnetic material, iron having less impurities, low-carbon steel, a magnetic steel sheet, martensitic stainless steel, etc. are used.

The magnets 42 are attached at positions opposing a low pressure fluid side end face 44a of the retainer 44 in a low pressure side inner wall portion 41e of the holder 41a. The retainer 44 of the floating ring 45 is contactlessly biased to the low pressure fluid side (seal portion 14) in the axial direction by magnetic force of the magnets 42, and by the pressure of the fluid acting from the high pressure fluid side to the low pressure fluid side, a seal ring seal face 13c and a holder seal face 41c are closely attached to each other, so that sealing is made between the seal ring 13 and the holder 41a. The seal portion 14 is formed by the seal ring seal face 13c and the holder seal face 41c. As described later, the holder 41a may be a magnetic body or may be a non-magnetic body.

The magnets 42 are permanent magnets made of ferrite magnets, neodymium magnets, samarium-cobalt magnets, alnico magnets, praseodymium magnets, etc., and the magnets are selected according to a temperature condition for use and required magnetic force. The magnets 42 are attached to the holder 41a. Thus, even when the floating ring 45 becomes an object to be replaced, cost is not increased. As shown in FIG. 9, an arrangement of the magnets 42 can be made by various patterns.

FIG. 9A is a view taken along the arrow C-C of FIG. 8, showing a circumferential arrangement of the magnets attached to the floating ring 45. In the magnet arrangement of FIG. 9A, the plural magnets are arranged so that magnetic pole faces 42a, 42b of the magnets 42 are directed in the axial direction in the holder 41a made of a magnetic body, and all the circumferentially adjacent magnets 42 have the same magnetic pole as each other. Specifically, all the S magnetic pole faces 42b are arranged on the low pressure side inner wall portion 41e side of the holder 41a. All the N magnetic pole faces 42a may be arranged on the low pressure side inner wall portion 41e side of the holder 41a. In such a way, by arranging the magnets so that the adjacent magnets 42 have the same magnetic pole as each other, the magnetic flux of the N pole and the S pole adjacent to each other become repulsive against each other and flow in the axial direction, capable of acting on the retainer 44. By making the holder 41a of a magnetic material, the holder 41a can function as a yoke. Thus, it is possible to enhance magnetic attracting force. Although the magnetic attracting force is weaker, the holder 41a may be made of a non-magnetic body.

Next, a magnet arrangement of FIG. 9B will be described. The magnet arrangement of FIG. 9B is different from the magnet arrangement of FIG. 9A in a point that the plural magnets are arranged so that the magnetic pole faces of the magnets 42 are directed in the circumferential direction with respect to the low pressure side inner wall portion 41e of the holder 41a made of a magnetic body. In order to prevent short of the magnetic flux from the N pole to the S pole, the circumferentially adjacent magnets 42 are arranged to have the same magnetic pole as each other. Since the adjacent magnets 42 are arranged to have the same magnetic pole, for example, the magnetic flux of the same poles become repulsive against each other and flow in the axial direction. Thus, magnetic attracting force acts on the retainer 44. Conversely, when the adjacent magnets 42 are arranged to have different magnetic poles from each other, for the magnetic flux, a short circuit occurs between the N pole and the S pole adjacent to each other, and almost no force to attract the retainer 44 is generated. By making the holder 41a of a magnetic material, the holder 41a can function as a yoke. Thus, it is possible to enhance the magnetic attracting force. The holder 41a may also be made of a non-magnetic body.

Next, a magnet arrangement of FIG. 9C will be described. The magnet arrangement of FIG. 9C is different from the magnet arrangements of FIGS. 9A, 9B in a point that the plural magnets are arranged so that the magnetic pole faces of the magnets 42 are directed in the circumferential direction with respect to the low pressure side inner wall portion 41e of the holder 41a made of a non-magnetic body and yokes 46 are arranged on N magnetic pole faces and S magnetic pole faces. By the yokes 46 arranged on the N magnetic pole faces and the S magnetic pole faces, magnetic flux mg of the N magnetic pole and magnetic flux mg of the S magnetic pole can act on the low pressure fluid side end face 44a of the retainer 44. Thus, even when the holder 41a is made of a non-magnetic body, force to attract the retainer 44 is not lowered. Unlike FIG. 9B, even when the adjacent magnets 42 have different magnetic poles from each other, by the yokes 46 covering the N magnetic pole faces and the S magnetic pole faces, it is possible to prevent short of the magnetic flux between the N pole and the S pole adjacent to each other.

Fourth Embodiment

Next, a seal device 50 according to a fourth embodiment will be described with reference to FIGS. 10 and 11. The seal device 50 of the fourth embodiment is different from the seal devices 10, 30, 40 of the first to third embodiments in which the floating rings 15, 35, 45 are biased to the low pressure fluid side of the holder 11a by utilizing the magnetic attracting force of the magnets 12, 32, 42 in a point that a floating ring 55 is biased to the low pressure fluid side of a holder 11a by magnetic repulsion force of magnets 52 provided in an outer periphery of the floating ring 55 and magnets 56 provided in a flange 51b. The same configurations as the above embodiments will be given the same reference signs and overlapping descriptions will be omitted.

The floating ring 55 is mainly formed by a seal ring 13, a retainer 54 provided in an outer periphery of the seal ring 13, and the magnets 52 embedded in the retainer 54.

The retainer 54 is an annular member fitted to the outer periphery of the seal ring 13. The retainer is made of a magnetic material so as to function as a yoke. As a magnetic material, iron having less impurities, low-carbon steel, a magnetic steel sheet, martensitic stainless steel, etc. are used.

The plural magnets 52 are embedded so that the same poles oppose the flange 51b. Meanwhile, the plural magnets 56 are embedded in a flange inner wall portion 51c so that the magnetic poles oppose the magnetic poles of the magnets 52 having the same polarity. By magnetic repulsion force of the magnets 52 and the magnets 56, the floating ring 55 is biased to the low pressure fluid side (seal portion 14) in the axial direction. The floating ring 55 is biased by the pressure of the fluid and magnetic force of the magnets 52, and a seal ring seal face 13c and a holder seal face 11c are closely attached to each other, so that sealing is made between the seal ring 13 and the holder 11a. The seal portion 14 is formed by the seal ring seal face 13c and the holder seal face 11c.

Figure 10:
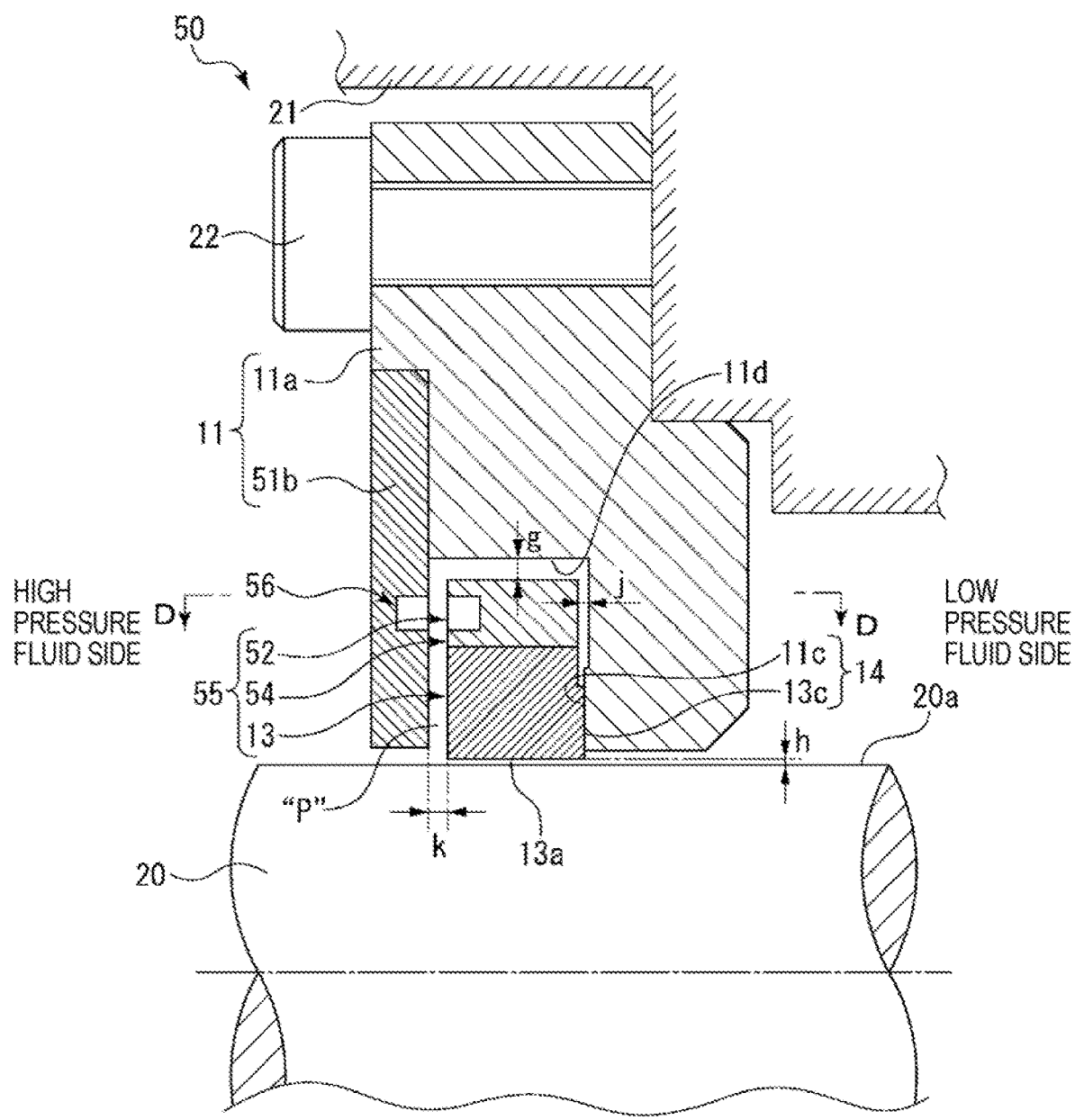
FIG. 10 is a front sectional view of a fourth embodiment of a seal device of the present invention.
Figure 11:
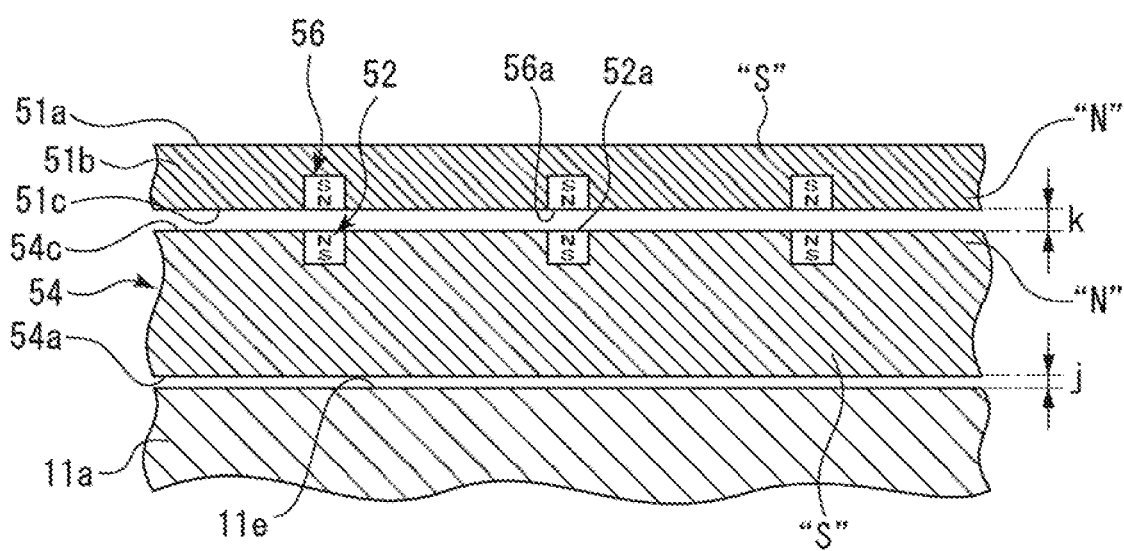
FIG. 11 is a view taken along the arrow D-D of FIG. 10, showing a circumferential arrangement of magnets attached to a floating ring and a housing.
Figure 12:
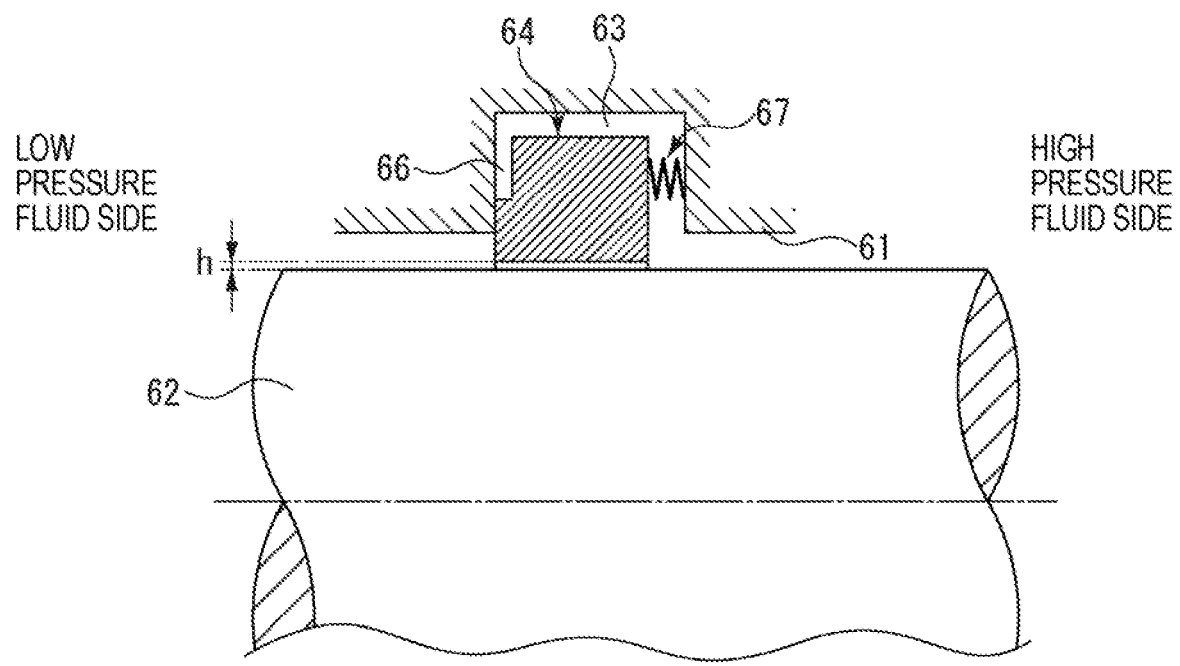
FIG. 12 is a view showing a conventional seal device.

FIG. 11 is a view taken along the arrow D-D of FIG. 10, showing a circumferential arrangement of the magnets attached to the floating ring 55 and the flange 51b. In the magnet arrangement of FIG. 11, the plural magnets are arranged so that magnetic pole faces 52a of the magnets 52 are exposed with respect to a high pressure fluid side end face 54c of the retainer 54 made of a magnetic body. Meanwhile, the plural magnets 56 are embedded in the flange inner wall portion 51c, and magnetic pole faces 56a having the same polarity as the magnetic pole faces 52a of the magnets 52 are arranged to the retainer 54. By making the retainer 54 of a magnetic body, the high pressure fluid side end face 54c can be magnetized to be the N pole over the entire circumference in the circumferential direction, and a low pressure fluid side end face 54a can be magnetized to be the S pole over the entire circumference. Similarly, the flange inner wall portion 51c can be magnetized to be the N pole over the entire circumference. Thereby, even when positions of the magnetic pole faces 52a of the magnets 52 and the magnetic pole faces 56a of the magnets 56 are displaced, the magnetic repulsion force is not changed, and it is possible to stably bias the floating ring 55 to the low pressure fluid side. By making the retainer 54 and the flange 51b of a magnetic body, it is possible to obtain an effect of preventing magnetic flux from leaking out to the outside of the seal device 50.

The embodiments of the present invention are described above with the drawings. However, specific configurations are not limited to these embodiments but the present invention includes modifications and additions within a range not departing from the gist of the present invention.

For example, in the above embodiments, the floating ring 15 is an annular integrated body. However, the present invention is not limited to this but members formed by dividing in the circumferential direction may be assembled into an annular integrated body.

In the above embodiments, the bias means are formed by the permanent magnets. However, the present invention is not limited to this. For example, the holder and the flange may be formed by attaching electromagnets in place of the permanent magnets.

In a case where a working fluid of a pump is a super-low-temperature fluid such as liquid helium, superconducting magnets may be used in place of the permanent magnets. The superconducting magnets have the flux pinning effect. Thus, an effect of suppressing run-out of the rotation shaft can also be obtained.

The present invention is mainly used for the purpose of the seal device but may be used as a damping device that damps vibration of a shaft.

REFERENCE SIGNS LIST 10 seal device
11 housing
11a holder
11b flange
11e low pressure side inner wall portion (seal portion side inner wall portion)
11f outside annular groove portion (groove portion)
11h flange inner wall portion
11g inside annular groove portion (groove portion)
12 magnet (bias means)
12a magnetic pole face (high pressure fluid side end face of floating ring)
12b magnetic pole face (low pressure fluid side end face of floating ring)
13 seal ring
15 floating ring
20 rotation shaft
21 casing
22 fastening means
30 seal device
32 magnet (bias means)
32b magnetic pole face (low pressure fluid side end face of floating ring)
34 yoke (magnetic member)
34a end face (high pressure fluid side end face of floating ring)
34c end face (low pressure fluid side end face of floating ring)
35 floating ting
40 seal device
41a holder
41e low pressure side inner wall portion (inner wall portion of housing)
42 magnet (bias means)
44 retainer
44a low pressure fluid side end face (low pressure fluid side end face of floating ring)
45 floating ring
46 yoke (magnetic member)
50 seal device
51c flange inner wall portion
52 magnet (bias means)
55 floating ring
56 magnet (bias means)
P space
h radial gap
j first axial space (seal portion opposite side space)
k second axial space (seal portion side space)

The invention claimed is:

1. A seal structure that secures a seal between a housing made of a magnetic material and a rotation shaft passing through the housing, the seal structure comprising:
    the housing;
    a floating ring arranged with a gap with respect to the rotation shaft, wherein the floating ring has a first portion contacting the housing, and a second portion not contacting the housing;
    a seal portion formed by bringing one end face of the floating ring into contact with the housing in an axial direction;
    a first axial space provided between the second portion of the floating ring and a seal portion side of the housing facing the floating ring in the axial direction; and
    a magnet that contactlessly biases the floating ring to the seal portion via the first axial space,
    wherein the floating ring includes a seal ring constituting the seal portion, and the magnet that is provided radially outside the seal ring, and
    wherein the seal portion side of the housing has an outer annular groove portion at a position opposing, in the axial direction, a radially outer peripheral face of the magnet, and an inner annular groove portion at a position opposing, in the axial direction, a radially inner peripheral face of the magnet.

2. The seal structure according to claim 1, wherein the magnet includes a magnetic member that covers at least one of magnetic pole faces.

3. The seal structure according to claim 1, wherein the first axial space is narrower, in the axial direction, than a second axial space provided between an opposite side of the floating ring, opposite to the seal portion in the axial direction, and a side of the housing facing the opposite side of the floating ring.

4. The seal structure according to claim 2, wherein the first space portion is narrower, in the axial direction, than a second space provided between an opposite side of the floating ring, opposite to the seal portion in the axial direction, and a side of the housing facing the opposite side of the floating ring.

5. The seat structure according to claim 1, wherein the first axial space is a space between the magnet of the floating ring and the seal portion side of the housing, and is narrower than a third axial space provided between the magnet of the floating ring and a bottom of each of the outer annular groove portion and the inner annular groove portion in the axial direction.

* * * * *